United States Patent
Yang et al.

(10) Patent No.: US 11,281,823 B2
(45) Date of Patent: Mar. 22, 2022

(54) PREDICTION MODEL FOR LIP STICKING FORCE OF CIGARETTE TIPPING PAPER, CONSTRUCTION METHOD AND PREDICTION METHOD THEREOF

(71) Applicant: CHINA TOBACCO YUNNAN INDUSTRIAL CO., LTD, Kunming (CN)

(72) Inventors: Ji Yang, Kunming (CN); Zhihua Liu, Kunming (CN); Chunbo Liu, Kunming (CN); Ruizhi Zhu, Kunming (CN); Tao Zhang, Kunming (CN); Xiaoxi Si, Kunming (CN); Fengmei Zhang, Kunming (CN); Pei He, Kunming (CN); Wei Jiang, Kunming (CN); Zhenjie Li, Kunming (CN); Zhongbi Su, Kunming (CN)

(73) Assignee: CHINA TOBACCO YUNNAN INDUSTRIAL CO., LTD, Kunming (CN)

( * ) Notice: Subject to any disclaimer, the term of this patent is extended or adjusted under 35 U.S.C. 154(b) by 0 days.

(21) Appl. No.: 17/292,459

(22) PCT Filed: Dec. 30, 2020

(86) PCT No.: PCT/CN2020/141633
§ 371 (c)(1),
(2) Date: May 10, 2021

(87) PCT Pub. No.: WO2021/121434
PCT Pub. Date: Jun. 24, 2021

(65) Prior Publication Data
US 2022/0043949 A1    Feb. 10, 2022

(30) Foreign Application Priority Data
Jun. 22, 2020  (CN) .................... CN202010576789.0

(51) Int. Cl.
*G01N 19/04*    (2006.01)
*A24C 5/34*    (2006.01)
(Continued)

(52) U.S. Cl.
CPC ............. *G06F 30/20* (2020.01); *A24C 5/34* (2013.01); *G01N 19/04* (2013.01); *G06F 2111/10* (2020.01); *G06F 2119/14* (2020.01)

(58) Field of Classification Search
CPC ........ A24C 5/34; G01N 19/04; G06F 2119/14
See application file for complete search history.

(56) References Cited

U.S. PATENT DOCUMENTS

| | | | | |
|---|---|---|---|---|
| 2003/0109811 A1* | 6/2003 | Koenig | ............... | G01N 19/02 |
| | | | | 600/587 |
| 2013/0189460 A1 | 7/2013 | Hamilton | | |

FOREIGN PATENT DOCUMENTS

| CN | 104483252 A | 4/2015 |
|---|---|---|
| CN | 104594109 A | 5/2015 |

(Continued)

OTHER PUBLICATIONS

GB10006-88, Plastics-Film and sheeting-Determination of the coefficients of friction, 1988, pp. 54-57.
(Continued)

*Primary Examiner* — Rehana Perveen
*Assistant Examiner* — Alfred H B Wechselberger
(74) *Attorney, Agent, or Firm* — Bayramoglu Law Offices LLC (57) ABSTRACT

The present invention relates to a prediction model for a lip sticking force of a cigarette tipping paper, a construction method and a prediction method thereof, which belongs to the technical field of analysis and detection. In the method, the stepwise regression analysis is performed on the lip sticking force and values of the dynamic friction coefficient (Continued)

and the grammage of the cigarette tipping paper to obtain a model for predicting the lip sticking force of the cigarette tipping paper. When checking the accuracy of the model, it is found that the predicted value and the measured value basically fall near the 1:1 line, $R^2$ index is 0.99, and the normalized root mean square error (nRMSE) is 2.64%. The present invention provides a method capable of quickly and simply quantifying a sticking force of the cigarette tipper paper to lips.

12 Claims, 3 Drawing Sheets

(51) Int. Cl.
*G06F 119/14* (2020.01)
*G06F 30/20* (2020.01)
*G06F 111/10* (2020.01)

(56) References Cited

FOREIGN PATENT DOCUMENTS

| CN | 204742617 U | 11/2015 |
|---|---|---|
| CN | 206219893 U | 6/2017 |
| CN | 110747691 A | 2/2020 |
| CN | 111723489 A | 9/2020 |

OTHER PUBLICATIONS

GB/T 451.3-2002, Paper and board-Determination of thickness, 2002, pp. 1-5.
GB/T 451.2-2002, Paper and board-Determination of grammage, 2002, pp. 1-2.

\* cited by examiner

FIG. 5

PREDICTION MODEL FOR LIP STICKING FORCE OF CIGARETTE TIPPING PAPER, CONSTRUCTION METHOD AND PREDICTION METHOD THEREOF

CROSS REFERENCE TO THE RELATED APPLICATIONS

This application is the national stage entry of International Application No. PCT/CN2020/141633, filed on Dec. 30, 2020, which is based upon and claims priority to Chinese Patent Application No. 202010576789.0 filed on Jun. 22, 2020, the entire contents of which are incorporated herein by reference.

TECHNICAL FIELD

The present invention belongs to the technical field of analysis and detection, in particular, relates to a prediction model for a lip sticking force of a cigarette tipping paper, a construction method and a prediction method thereof.

BACKGROUND

A cigarette filter is mainly composed of cellulose acetate, plug wrap paper and tipping paper. The tipping paper, also known as imitation cork paper, is used to wrap the outside of the filter tip and stick the filter tip to an end of a cigarette rod. The tipping paper is a kind of decorative paper obtained by printing, coating and processing the base paper. The tipping paper typically has a cork-like or opaque white appearance and has an ornamental function. The tipping paper is in direct contact with the smoker's lips, and generally, the tipper paper is printed only with paint or ink. In dry weather, when a person smokes a cigarette, a small amount of saliva may wet the tipping paper, and then the tipping paper dries slowly in the process of smoking, such that salivary protein remaining on the lips will have a sticking effect on the tipping paper, causing the tipping paper on the filter tip to stick to the skin of the lip. Consequently, the lip is likely to bleed due to tearing. After smoking, the filter tip cannot be spit out smoothly, which seriously affects the experience of the smoker.

At present, research of the cigarette filter tipping paper at home and abroad mostly focuses on its pyrolysis characteristics, poor ignitability, harmful element content, cigarette paper modification and carbon monoxide release ability after modification, toxicity, safety evaluation, etc. However, there is no related research on lip sticking force or lip sticking degree thereof. The composition and process of tipping paper are improved when it comes to lip sticking aspect, but there is no specific detection method. For example, Feng Li's invention patent "Scented health-care tipping paper capable of avoiding sticking to lips and preventing lips and tongue from drying and preparation method thereof discloses the process and the formulation of tipping paper, but only the longitudinal tensile strength and the air permeability of the base paper are detected during effect detection, and the lip sticking force detection is not mentioned. The invention patent "Anti-pollution filter tip of anti-sticking lip" discloses that a protective film is coated on the outside of the tipping paper, but it does not prove the actual beneficial results. The invention patent "Multi-functional Imitation Cork Paper" of Zhejiang Techmay New Materials Co., Ltd. aims to prevent lip sticking, add fragrance, and lower ignitability, etc. The outer layer of the imitation cork paper is compounded with a fruity waterproof layer and a protective film layer, but the test result of preventing lip sticking is not mentioned. Due to the lack of corresponding industry standards, the cigarette manufacturers evaluate and judge the sticking effect by means of personally trying out the cigarette, which has great subjectivity and uncertainty. In order to accurately determine the stickiness/sticking force of different processes and different types of tipping paper on lips, it is urgent to establish corresponding objective analysis and testing methods.

SUMMARY

The purpose of the present invention is to solve the shortcomings of the prior art, and to provide a prediction model for a lip sticking force of a cigarette tipping paper, a construction method and a prediction method thereof. Through this method, the dynamic friction coefficient and grammage value of conventional physical indicators of the cigarette tipping paper are measured and determined to properly predict the lip sticking force of the cigarette tipping paper, which is simple, feasible and easy to popularize and apply. When checking the accuracy of the model, it is found that the predicted value and the measured value basically fall near the 1:1 line, $R^2$ index is 0.99, and the normalized root mean square error (nRMSE) is 2.64%. The present invention can accurately predict a sticking force of the cigarette tipping paper to lips, can well avoid subjective factor influence and difference characterization brought by the traditional personal sensory smoking evaluation method, and has advantages in material selection, quality control and product upgrading in the tobacco industry.

To achieve the above purpose, the technical solution adopted by the present invention is as follows:

a prediction model for a lip sticking force of a cigarette tipping paper, wherein the model is:

when a thickness of the cigarette tipping paper is in a range of (0.069 mm, 0.112 mm), $Y_{lip\ sticking\ force} = 0.205 + 1.038 \times M_{friction\ coefficient}$;

when the thickness of the cigarette tipping paper is not in the range of (0.069 mm, 0.112 mm), $Y_{lip\ sticking\ force} = -0.335 + 1.181 \times M_{friction\ coefficient} \times D_{grammage}$;

wherein $Y_{lip\ sticking\ force}$ is a predicted lip sticking force of the cigarette tipping paper; $M_{friction\ coefficient}$ is a dynamic friction coefficient of the cigarette tipping paper; and $D_{grammage}$ is a grammage of the cigarette tipping paper, that is, gram weight per unit area.

In addition, the present invention provides a construction method of the above prediction model for a lip sticking force of a cigarette tipping paper, which includes:

step (1), using a tester to measure a sticking force, wherein the sticking force is between printing surfaces of different tipping paper and an artificial mouth skin bonded together through artificial saliva, and calculating the sticking force per unit area as a measured lip sticking force of the cigarette tipping paper; wherein the tester is a debonding strength tester, a tensile tester or a dynamic friction coefficient determinator;

step (2), determining the dynamic friction coefficient of the cigarette tipping paper;

step (3), determining the thickness of the cigarette tipping paper;

step (4), determining the grammage of the cigarette tipping paper; and step (5), performing regression analysis by using the dynamic friction coefficient (M), the grammage (D) and the thickness (H) of the cigarette tipping paper as variables, and using the lip sticking force of the tipping paper as a reaction variable (Y) to obtain the prediction model for a lip sticking force of a cigarette tipping paper.

Further, it is preferable that in step (1), the cigarette tipping paper has a width range of 1 mm to 1000 mm and a length range of 1 mm to 1000 mm; the artificial mouth skin is cut into a rectangle with the same size as the cigarette tipping paper, one side of the cut artificial mouth skin oppositely sticks to one side of the cigarette tipping paper through the artificial saliva, a sticking area is determined, and after staying aside until constant weight, the tester is used to measure a maximum debonding force of the tipping paper and artificial lips at the moment of separating, and the maximum debonding force is used as the sticking force thereof.

Further, it is preferable that a staying-aside time is 1 s to 1800 s.

Further, it is preferable that after staying aside until the constant weight, the other side of the tipping paper and the other side of the artificial mouth skin that are not bonded together are respectively clamped on two jigs of the tester, a distance and a relative movement rate between the two jigs are set to collect the maximum debonding force at the moment of separating the tipping paper from the artificial lip; the two jigs of the tester can completely clamp the cigarette tipping paper and the artificial mouth skin; the tester has a load range of 0 N to 200 N and a resolution of greater than and equal to 0.01 N; and the distance between the two jigs of the tester is 5 mm to 500 mm, and the movement rate is 1 mm/min to 500 mm/min.

Further, it is preferable that in step (1), the artificial saliva includes sodium chloride, potassium chloride, calcium chloride, sodium dihydrogen phosphate, magnesium chloride, urea, glucose, mucin, amylase, acid phosphatase and lysozyme; a pH value of the artificial saliva is 5.5 to 7.5; and a volume range of the artificial saliva used is 1 µL to 1000 µL.

Further, it is preferable that in step (1), the artificial saliva contains 1.40 mmol/L sodium chloride, 0.5 mmol/L potassium chloride, 0.1 mmol/L calcium chloride, 0.15 mmol/L sodium dihydrogen phosphate, 0.025 mmol/L magnesium chloride, 0.09 mmol/L urea, 0.2 mmol/L glucose, 2.7 mmol/L bovine submandibular gland salivary mucin, 2.5 units/mL amylase, 0.004 units/mL acid phosphatase, and 0.7 units/mL lysozyme.

Further, it is preferable that a material of the artificial mouth skin is medical silicone rubber soft skin, active composite skin with an epidermal cell layer, polyvinyl chloride artificial leather, polyurethane dry artificial leather or polyolefin artificial leather.

Further, it is preferable to determine the dynamic friction coefficient of the cigarette tipping paper in accordance with GB10006-88 Plastics-Film and sheeting-Determination of the coefficients of friction in step (2);

to determine the thickness of the cigarette tipping paper in accordance with GB/T 451.3-2002 Paper and board-Determination of thickness in step (3); and to determine the grammage of the cigarette tipping paper in accordance with GB/T 451.2-2002 Paper and board-Determination of grammage in step (4).

The present invention also provides a prediction method for the lip sticking force of the cigarette tipping paper which adopts the above prediction model for a lip sticking force of a cigarette tipping paper or the prediction model for a lip sticking force of a cigarette tipping paper constructed by the above construction method of the prediction model for a lip sticking force of a cigarette tipping paper, specifically as follows:

collecting a thickness, a dynamic friction coefficient and a gram weight per unit area of the cigarette tipping paper, and then bringing the thickness, the dynamic friction coefficient and the gram weight per unit area into the prediction model for a lip sticking force of a cigarette tipping paper for calculation, to obtain the cigarette tipping paper lip sticking force.

Compared with the prior art, the present invention has the following advantages:

1. The invention provides a prediction model for a lip sticking force of a cigarette tipping paper and a construction method and a prediction method thereof, which can objectively and accurately quantify the tipping paper lip sticking force, can effectively avoid the traditional fuzzy concepts such as lip sticking feeling and poor spitting feeling obtained by means of sensory evaluation, and avoid the disadvantages of strong subjective factors, great differences in assessment results, harm to human health and the like.

2. The method of the present invention performs stepwise regression analysis on the lip sticking force and values of the dynamic friction coefficient and the grammage of the cigarette tipping paper to obtain a model for predicting the lip sticking force of the cigarette tipping paper. In this method, the conventional physical indicators, that is the dynamic friction coefficient and grammage value of the cigarette tipping paper, are determined to better predict the lip sticking force of the cigarette tipping paper, which is simple, feasible and easy to popularize and apply.

3. When checking the accuracy of the model of the present invention, it is found that the predicted value and the measured value basically fall near the 1:1 line, $R^2$ index is 0.99, and the normalized root mean square error (nRMSE) is 2.64%. The method can accurately quantify the lip sticking force of the cigarette tipping paper, greatly saves the detection cost, is objective and efficient, and has certain advantages in material selection, quality control and product upgrading in the tobacco industry.

BRIEF DESCRIPTION OF THE DRAWINGS

FIG. 2 is a second schematic diagram of the tester;
wherein 1 is jigs; 2 is chucks; 3 is cigarette tipping paper; 4 is artificial saliva for smearing; 5 is artificial mouth skin; 6 is an intelligent board containing force sensors and displacement sensors; and 7 is a force and displacement acquisition device;

DETAILED DESCRIPTION OF THE EMBODIMENTS

The present invention will be further described in detail below in conjunction with embodiments.

It will be understood by those skilled in the art that the following embodiments are merely used for explaining the present invention and should not be construed as restraints in the scope of the present invention. If some specific technology or conditions are not specified in the embodiments, the embodiments shall be carried out according to the technology or conditions described in the literature in the art or according to the product specification. If the manufacturer of the materials or equipment used is not specified, the materials or equipment are all conventional products that can be purchased.

Unless specifically described in the following embodiments, the percentages are all weight percentages.

Embodiment 1

A prediction model for a lip sticking force of a cigarette tipping paper, wherein the model is:

when a thickness of the cigarette tipping paper belongs to a range of (0.069 mm, 0.112 mm), $Y_{lip\ sticking\ force}=0.205+1.038\times M_{friction\ coefficient}$;

when the thickness of the cigarette tipping paper does not belong to the range of (0.069 mm, 0.112 mm), $Y_{lip\ sticking\ force}=-0.335+1.181\times M_{friction\ coefficient}\times D_{grammage}$;

wherein $Y_{lip\ sticking\ force}$ is a predicted lip sticking force of the cigarette tipping paper; $M_{friction\ coefficient}$ is a dynamic friction coefficient of the cigarette tipping paper; and $D_{grammage}$ is a grammage of the cigarette tipping paper, that is, gram weight per unit area.

Embodiment 2

A construction method of a prediction model for a lip sticking force of a cigarette tipping paper, which includes:

step (1), using a tester to measure a sticking force with which printing surfaces of different tipping paper and an artificial mouth skin are bonded together through artificial saliva, and calculating the sticking force per unit area as a measured lip sticking force of the cigarette tipping paper; wherein the tester is a debonding strength tester;

step (2), determining the dynamic friction coefficient of the cigarette tipping paper;

step (3), determining the thickness of the cigarette tipping paper;

step (4), determining the grammage of the cigarette tipping paper; and step (5), performing regression analysis by using the dynamic friction coefficient (M), the grammage (D) and the thickness (H) of the cigarette tipping paper as variables, and using the lip sticking force of the tipping paper as a reaction variable (Y) to obtain the prediction model for a lip sticking force of a cigarette tipping paper.

Embodiment 3

A construction method of a prediction model for a lip sticking force of a cigarette tipping paper includes the following step.

Step (1), using a tester to measure a sticking force with which printing surfaces of different brands of tipping paper and an artificial mouth skin are bonded together through artificial saliva, and calculating the sticking force per unit area as a measured lip sticking force of the cigarette tipping paper; wherein the tester is a tensile tester.

Specifically, the artificial mouth skin is cut into a rectangle with the same size as the cigarette tipping paper. One side of the cut artificial mouth skin oppositely sticks to one side of the cigarette tipping paper through the artificial saliva. A sticking area is determined. After staying aside until constant weight, the tester is used to measure a maximum debonding force of the tipping paper and the artificial lips at the moment of separating, and the maximum debonding force is used as the sticking force thereof. The cigarette tipping paper has a width range of 1 mm and a length range of 1 mm. The staying-aside time is 1 s. The artificial saliva includes sodium chloride, potassium chloride, calcium chloride, sodium dihydrogen phosphate, magnesium chloride, urea, glucose, mucin, amylase, acid phosphatase and lysozyme. The pH value of the artificial saliva is 5.5. The volume of the artificial saliva used is 1 μL. The smearing area is $0.5\times1=0.5$ mm$^2$. The material of the artificial mouth skin is medical silicone rubber soft skin.

Step (2), determining the dynamic friction coefficient of the cigarette tipping paper.

Step (3), determining the thickness of the cigarette tipping paper.

Step (4), determining the grammage of the cigarette tipping paper.

Step (5), performing regression analysis by using the dynamic friction coefficient (M), the grammage (D) and the thickness (H) of the cigarette tipping paper as variables, and using the lip sticking force of the tipping paper as a reaction variable (Y) to obtain the prediction model for a lip sticking force of a cigarette tipping paper.

Embodiment 4

A construction method of a prediction model for a lip sticking force of a cigarette tipping paper includes the following steps.

Step (1), using a tester to measure a sticking force with which printing surfaces of different brands of tipping paper and an artificial mouth skin are bonded together through artificial saliva, and calculating the sticking force per unit area as a measured lip sticking force of the cigarette tipping paper; wherein the tester is a tensile tester.

Specifically, the artificial mouth skin is cut into a rectangle with the same size as the cigarette tipping paper. One side of the cut artificial mouth skin oppositely sticks to one side of the cigarette tipping paper through the artificial saliva. The sticking area is determined. After staying aside until constant weight, the tester is used to measure a maximum debonding force of the tipping paper and the artificial lips at the moment of separating, and the maximum debonding force is used as the sticking force thereof. The cigarette tipping paper has a width range of 1000 mm and a length range of 1000 mm. The staying-aside time is 1800 s. The artificial saliva contains 1.40 mmol/L sodium chloride, 0.5 mmol/L potassium chloride, 0.1 mmol/L calcium chloride, 0.15 mmol/L sodium dihydrogen phosphate, 0.025 mmol/L magnesium chloride, 0.09 mmol/L urea, 0.2 mmol/L glucose, 2.7 mmol/L bovine submandibular gland salivary mucin, 2.5 units/mL amylase, 0.004 units/mL acid phosphatase, and 0.7 units/mL lysozyme. The volume of the artificial saliva used is 1000 μL. The smearing area is $500\times1000=500000$ mm$^2$. The material of the artificial mouth skin is active composite skin with an epidermal cell layer. The tester has a load range of 0 N to 200 N and a resolution of greater than and equal to 0.01 N. The distance between the two jigs of the tester 500 mm, and the movement rate is 500 mm/min.

Step (2), determining the dynamic friction coefficient of the cigarette tipping paper.

Step (3), determining the thickness of the cigarette tipping paper.

Step (4), determining the grammage of the cigarette tipping paper.

Step (5), performing regression analysis by using the dynamic friction coefficient (M), the grammage (D) and the thickness (H) of the cigarette tipping paper as variables, and using the lip sticking force of the tipping paper as a reaction variable (Y) to obtain the prediction model for a lip sticking force of a cigarette tipping paper.

Embodiment 5

A construction method of a prediction model for a lip sticking force of a cigarette tipping paper includes the following steps.

Step (1), using a tester to measure a sticking force with which printing surfaces of different brands of tipping paper and an artificial mouth skin are bonded together through artificial saliva, and calculating the sticking force per unit area as a measured lip sticking force of the cigarette tipping paper; wherein the tester is a debonding strength tester.

Specifically, the artificial mouth skin is cut into a rectangle with the same size as the cigarette tipping paper. One side of the cut artificial mouth skin oppositely sticks to one side of the cigarette tipping paper through the artificial saliva. The sticking area is determined. After staying aside until constant weight, the other side of the tipping paper and the other side of the artificial mouth skin that are not bonded together are respectively clamped on two jigs of the tester. The distance and the relative movement rate between the two jigs are set to collect the maximum debonding force at the moment of separating the tipping paper from the artificial lip, and the maximum debonding force is used as the sticking force thereof. The cigarette tipping paper has a width range of 200 mm and a length range of 100 mm; the staying-aside time is 300 s. The artificial saliva contains 1.40 mmol/L sodium chloride, 0.5 mmol/L potassium chloride, 0.1 mmol/L calcium chloride, 0.15 mmol/L sodium dihydrogen phosphate, 0.025 mmol/L magnesium chloride, 0.09 mmol/L urea, 0.2 mmol/L glucose, 2.7 mmol/L bovine submandibular gland salivary mucin, 2.5 units/mL amylase, 0.004 units/mL acid phosphatase, and 0.7 units/mL lysozyme. The volume of the artificial saliva used is 100 μL. The smearing area is 90×200=18000 mm². The material of the artificial mouth skin is polyolefin artificial leather. The tester has a load range of 0 N to 200 N and a resolution of greater than and equal to 0.01 N. The distance between the two jigs of the tester 5 mm, and the movement rate is 1 mm/min.

Step (2), determining the dynamic friction coefficient of the cigarette tipping paper.

Step (3), determining the thickness of the cigarette tipping paper.

Step (4), determining the grammage of the cigarette tipping paper.

Step (5), performing regression analysis by using the dynamic friction coefficient (M), the grammage (D) and the thickness (H) of the cigarette tipping paper as variables, and using the lip sticking force of the tipping paper as a reaction variable (Y) to obtain the prediction model for a lip sticking force of a cigarette tipping paper.

In step (2), the dynamic friction coefficient of the cigarette tipping paper is determined in accordance with GB10006-88 Plastics-Film and sheeting-Determination of the coefficients of friction. In step (3), the thickness of the cigarette tipping paper is determined in accordance with GB/T 451.3-2002 Paper and board-Determination of thickness. In step (4), the grammage of the cigarette tipping paper is determined in accordance with GB/T 451.2-2002 Paper and board-Determination of grammage.

Embodiment 6

A prediction method for the paper lip sticking force of the cigarette tipping adopts the prediction model for a lip sticking force of a cigarette tipping paper or the prediction model for a lip sticking force of a cigarette tipping paper constructed by the construction method of the prediction model for a lip sticking force of a cigarette tipping paper, including: collecting a thickness, a dynamic friction coefficient and a gram weight per unit area of the cigarette tipping paper, and then bringing the thickness, the dynamic friction coefficient and the gram weight per unit area into the prediction model for a lip sticking force of a cigarette tipping paper for calculation, to obtain the lip sticking force of the cigarette tipping paper.

Application Example 1

Figure 1:
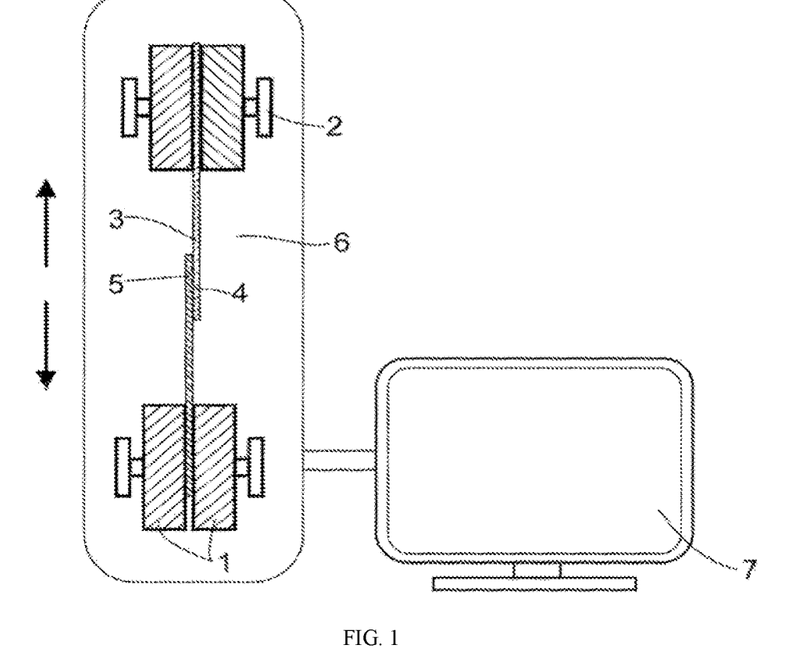
FIG. 1 is a first schematic diagram of a tester.

Step (1): twenty five pieces of different cigarette paper from China Tobacco Yunnan Industrial Co., Ltd are prepared and accurately cut to 15 mm in width and 50 mm in length. Artificial saliva is made according to Table 1. Medical silicon soft skin is prepared as the artificial mouth skin with a thickness of 1 mm, and the artificial mouth skin is cut to 15 mm in width and 50 mm in length. 10 μL artificial saliva is accurately transferred with a micro-injection needle and evenly smeared on the artificial mouth skin. The smearing area is 10×15=150 mm². The printing surface of cigarette tipping paper and the artificial mouth skin are bonded together through the artificial saliva and stay aside for 2 min. The M250-2.5 CT tensile tester of KARL company from Germany is selected as test equipment. As shown in FIG. 1, the other end of the bonded tipping paper and the other end of the artificial mouth skin are respectively clamped between the two chucks of the jigs of the tensile tester, where a chuck distance is set to 50 mm and a movement rate is set to 50 mm/min. The two jigs are installed on an intelligent board (existing equipment) containing a force value sensor and a displacement sensor, and a force value/displacement acquisition system (usually a computer) is connected with the intelligent board containing the force value sensor and the displacement sensor, which can collect the change data of the force value and displacement in real time. The maximum force collected at the moment when the tipping paper is separate from the artificial lips is the sticking force. The lip sticking force is calculated according to an equation: F=sticking force (N)/sticking area (mm²).

TABLE 1

Artificial saliva formulation

| Composition | Concentration (mg/mL) | Composition | Concentration (mg/mL) |
|---|---|---|---|
| NaCl | 1.4 | Glucose | 0.2 |
| KCl | 0.5 | Mucin | 2.7 |
| CaCl$_2$ | 0.1 | Amylase | 2.5* |
| NaH$_2$PO$_4$ | 0.15 | Acid phosphatase | 0.004* |
| MgCl$_2$ | 0.025 | Lysozyme | 0.7* |
| Urea | 0.09 | Adjust the pH to 7.0 before adding the protein | |

Note: *indicates Units/mL

Step (2), the dynamic friction coefficients of the twenty-five samples are determined in accordance with GB10006-88 Plastics-Film and sheeting-Determination of the coefficients of friction.

Step (3), the thicknesses of the twenty-five samples are determined in accordance with GB/T 451.3-2002 Paper and board-Determination of thickness.

Step (4), the grammages of the twenty-five samples are determined in accordance with GB/T 451.2-2002 Paper and board-Determination of grammage.

Step (5), test results are shown in Table 2.

TABLE 2

Sample Test Results

| Sample | Sticking force (N/mm$^2$) | Dynamic friction coefficient | Thickness (mm) | Grammage (g/m$^2$) | RSD (%) |
|---|---|---|---|---|---|
| 1  | 1.96 × 10$^{-3}$ | 0.409 | 0.043 | 39.28 | 1-6.9    |
| 2  | 0.68 × 10$^{-3}$ | 0.254 | 0.047 | 42.3  | 1.2-7.2  |
| 3  | 1.20 × 10$^{-3}$ | 0.374 | 0.042 | 36.9  | 1.3-7.7  |
| 4  | 1.29 × 10$^{-3}$ | 0.404 | 0.042 | 38.7  | 0.5-9.2  |
| 5  | 2.90 × 10$^{-3}$ | 0.432 | 0.044 | 39.3  | 0.2-9.8  |
| 6  | 1.45 × 10$^{-3}$ | 0.293 | 0.045 | 38.5  | 0.6-8.2  |
| 7  | 3.95 × 10$^{-3}$ | 0.541 | 0.043 | 36.34 | 1.2-9.2  |
| 8  | 0.91 × 10$^{-3}$ | 0.287 | 0.046 | 41.54 | 1.5-10   |
| 9  | 4.40 × 10$^{-3}$ | 0.6   | 0.043 | 37.54 | 1.4-9.3  |
| 10 | 0.87 × 10$^{-3}$ | 0.3   | 0.042 | 42.1  | 0.9-8.2  |
| 11 | 5.93 × 10$^{-3}$ | 0.75  | 0.04  | 37.1  | 1.6-8.4  |
| 12 | 1.10 × 10$^{-3}$ | 0.373 | 0.046 | 42.4  | 1.4-9.6  |
| 13 | 4.04 × 10$^{-3}$ | 0.608 | 0.04  | 36.4  | 0.2-7.2  |
| 14 | 1.20 × 10$^{-3}$ | 0.367 | 0.042 | 39.62 | 1.5-8.5  |
| 15 | 1.21 × 10$^{-3}$ | 0.306 | 0.04  | 37.94 | 1.0-9.8  |
| 16 | 1.32 × 10$^{-3}$ | 0.463 | 0.04  | 39.06 | 1.7-9.2  |
| 17 | 1.31 × 10$^{-3}$ | 0.285 | 0.044 | 41.28 | 1.0-7.7  |
| 18 | 2.90 × 10$^{-3}$ | 0.266 | 0.044 | 39.32 | 1.6-8.2  |
| 19 | 2.97 × 10$^{-3}$ | 0.323 | 0.04  | 38.54 | 2.2-9.7  |
| 20 | 3.47 × 10$^{-3}$ | 0.381 | 0.093 | 92    | 3.2-10.0 |
| 21 | 6.91 × 10$^{-3}$ | 0.884 | 0.11  | 83.3  | 2.4-9.4  |
| 22 | 0.78 × 10$^{-3}$ | 0.264 | 0.042 | 36.4  | 1.2-9.3  |
| 23 | 8.17 × 10$^{-3}$ | 0..943 | 0.1  | 89.45 | 1.7-7.9  |
| 24 | 4.25 × 10$^{-3}$ | 0.339 | 0.084 | 89.5  | 2.1-9.4  |
| 25 | 3.40 × 10$^{-3}$ | 0.292 | 0.069 | 53.7  | 1.4-8.8  |

Figure 3:
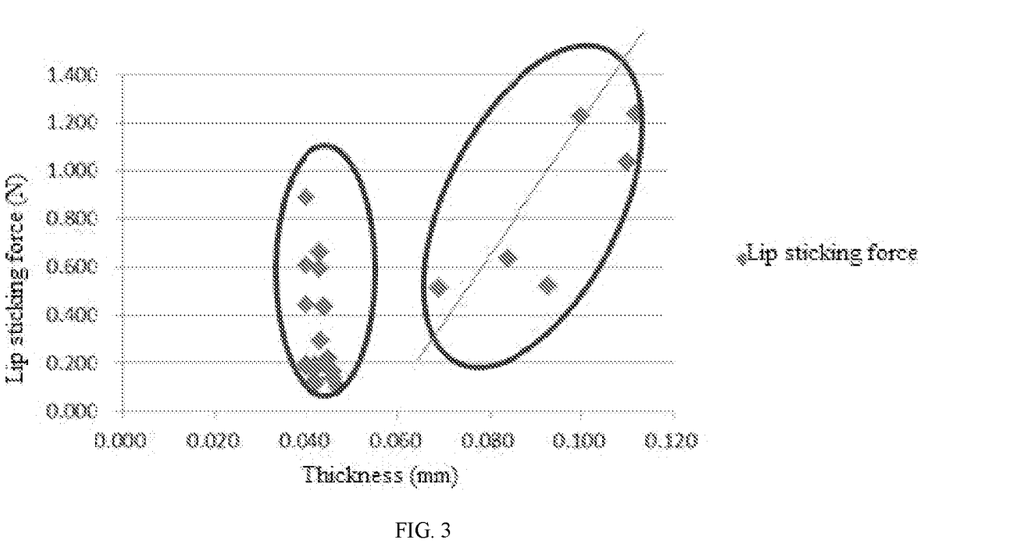
FIG. 3 shows a scatter plots chart of a correlation between a thickness and a lip sticking force of the cigarette tipping paper.
Figure 4:
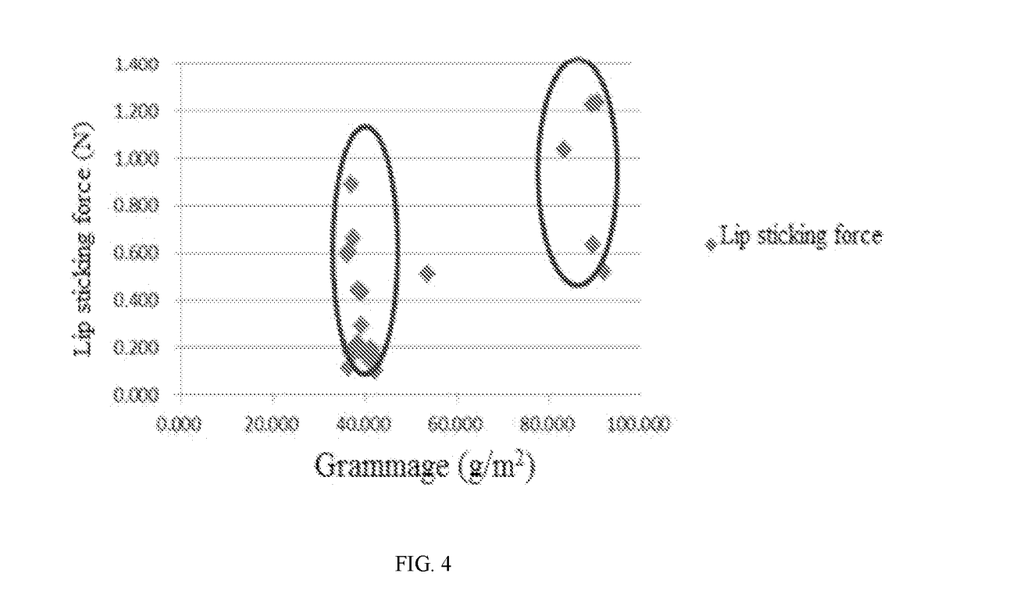
FIG. 4 shows a scatter plots chart of a correlation between a grammage and the lip sticking force of the cigarette tipping paper.

As can be seen from Table 3, the four indicators, i.e., the friction coefficient, the thickness, the grammage, and the lip sticking force, all have a relatively high degree of correlation therebetween, wherein the correlation between the friction coefficient and the lip sticking force is relatively large (0.897). In addition, it can be seen from FIGS. 3 and 4** that due to a stronger aggregation of the samples on the thickness and grammage gradient, the correlation between the thickness and the lip sticking force, and between the grammage and the lip sticking force can mainly be divided into two levels of thickness ranges (0.04-0.047, 0.069-0.112) and two levels of grammage ranges (36.34-42.4, 53.7-92), wherein the correlations within the thickness range (0.04-0.047) and the grammage ranges (36.34-42.4, 83.7-92) are not significant, while there is a certain correlation within the thickness (0.069-0.112) range level. Therefore, the correlations between the thickness and the lip sticking force, and between the grammage and the lip sticking force within the thickness (0.069-0.112) range level can be further investigated.

TABLE 3

Summary of correlation coefficients among the four indicators

|  |  | Friction coefficient | Thickness | Grammage | Lip sticking force |
|---|---|---|---|---|---|
| Friction coefficient | Pearson correlation | 1 | .618** | .520** | .897** |
|  | Significance (bilateral) |  | .001 | .007 | .000 |
|  | N | 26 | 26 | 26 | 26 |
| Thickness | Pearson correlation | .618** | 1 | .966** | .749** |
|  | Significance (bilateral) | 0.001 |  | 0 | 0 |
|  | N | 26 | 26 | 26 | 26 |

TABLE 3-continued

Summary of correlation coefficients among the four indicators

|  |  | Friction coefficient | Thickness | Grammage | Lip sticking force |
|---|---|---|---|---|---|
| Grammage | Pearson correlation | .520** | .966** | 1 | .683** |
|  | Significance (bilateral) | .007 | .000 |  | .000 |
|  | N | 26 | 26 | 26 | 26 |
| Lip sticking force | Pearson correlation | .897** | .749** | .683** | 1 |
|  | Significance (bilateral) | .000 | .000 | .000 |  |
|  | N | 26 | 26 | 26 | 26 |

**Significantly correlated at .01 level (bilateral).
Note: There is nothing in the statistical software in the space.

(1) Through the stepwise regression equation of the friction coefficient, the thickness, the grammage and the lip sticking force, it is found that there is a strong correlation between the thickness and the grammage, and there is a multicollinearity relationship between the thickness and the friction coefficient. Therefore, the thickness item is eliminated in the established stepwise regression equation, and the friction coefficient and the grammage are retained as representative items to establish a binary regression equation model, i.e., equation (1), with lip sticking force:

$$Y = -0.335 + 1.181 \times M + 0.005 \times D \qquad (1)$$

In the equation:
Y is the lip sticking force of the tipping paper, the unit is Newton per square millimeter (N/mm$^2$);
M is the dynamic friction coefficient, dimensionless; and
D is the tipping paper grammage, the unit is grams per square meter (g/m$^2$).

(2) Through the stepwise regression equation of the friction coefficient, the thickness, the grammage and the lip sticking force, it is found that there is a strong correlation between the thickness and the grammage, and there is a multicollinearity relationship among thickness, grammage and friction coefficient. Therefore, the thickness item and the grammage item are eliminated in the established stepwise regression equation, and the friction coefficient is retained as a representative item to establish a binary regression equation model, i.e., equation (2), with lip sticking force, which indicates that for the thicker tipping paper, the correlation between the dynamic friction coefficient and the lip sticking force is considered strong:

$$Y = 0.205 + 1.038 \times M \qquad (2)$$

In the equation:
Y is the tipping paper lip sticking force, the unit is Newton per square millimeter (N/mm$^2$); and
M is the dynamic friction coefficient, dimensionless.

Step (6): use and verification of a tipping paper lip sticking force model.

Ten kinds of tipping paper with different printing processes and different brands are selected, the dynamic friction coefficient of the tipping paper is determined, and then the lip sticking force of the tipping paper is predicted according to equation (1). The conventional tipping paper grammage is generally not higher than 0.069 mm, so the model (2) will not be used and verified here. Furthermore, the same samples are tested to simulate the lip sticking force according to the debonding strength tester, and the comparison results are shown in Table 4.

TABLE 4

Comparison between the predicted value and the measured value of the cigarette tipping paper lip sticking force

| Sample | Dynamic friction coefficient | Grammage (g/m$^2$) | Predicted sticking force (N/mm$^2$) | Actual sticking force (N/mm$^2$) | nRMSE (%) |
|---|---|---|---|---|---|
| 1 | 0.404 | 38.5 | 3.36 × 10$^{-1}$ | 3.20 × 10$^{-1}$ | 2.38 |
| 2 | 0.293 | 38.5 | 2.04 × 10$^{-1}$ | 1.98 × 10$^{-1}$ | 1.38 |
| 3 | 0.541 | 36.34 | 4.86 × 10$^{-1}$ | 4.59 × 10$^{-1}$ | 2.81 |
| 4 | 0.432 | 39.3 | 3.72 × 10$^{-1}$ | 3.54 × 10$^{-1}$ | 2.44 |
| 5 | 0.287 | 41.54 | 2.12 × 10$^{-1}$ | 2.32 × 10$^{-1}$ | 4.59 |
| 6 | 0.6 | 37.54 | 5.61 × 10$^{-1}$ | 5.45 × 10$^{-1}$ | 1.47 |
| 7 | 0.341 | 42.1 | 2.78 × 10$^{-1}$ | 2.98 × 10$^{-1}$ | 3.43 |
| 8 | 0.55 | 37.1 | 5.00 × 10$^{-1}$ | 4.89 × 10$^{-1}$ | 1.12 |
| 9 | 0.373 | 42.44 | 3.18 × 10$^{-1}$ | 3.23 × 10$^{-1}$ | 0.83 |
| 10 | 0.484 | 83.35 | 6.53 × 10$^{-1}$ | 6.48 × 10$^{-1}$ | 0.41 |

Figure 5:
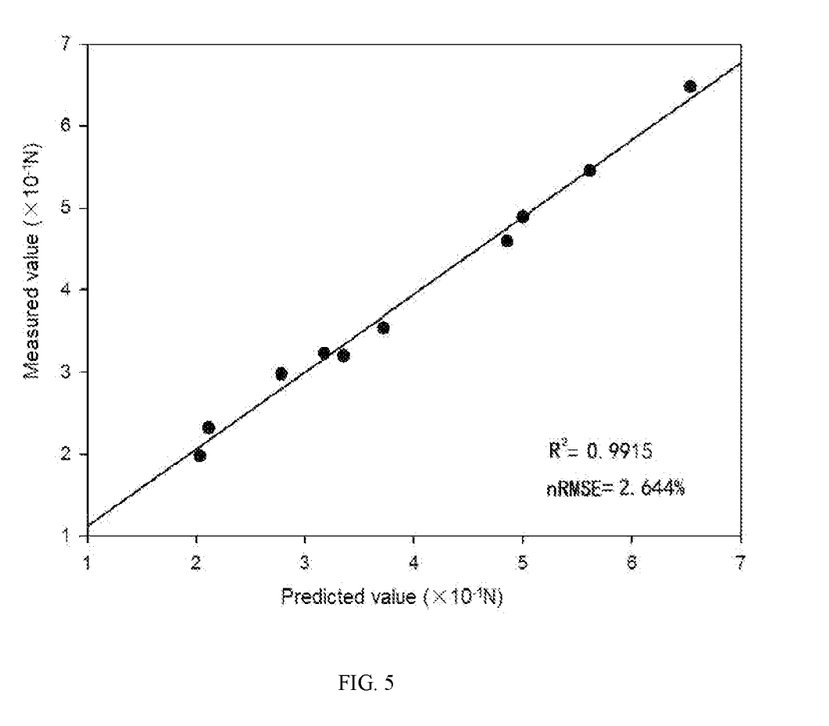
FIG. 5 shows a comparison diagram between a predicted value and a measured value of the lip sticking force of the cigarette tipping paper.

The above ten representative test sets are selected to check the accuracy of the model. FIG. 5 is a comparison between the predicted value and the measured value. As can be seen from the figure, the data points fall near the 1:1 line, R$^2$ is 0.99, and nRMSE is 2.64%. The predicted value of the lip sticking force of each sample is basically consistent with the measured value, which shows that the present invention can be used for predicting the lip sticking force of the cigarette tipping paper.

Application Example 2

Figure 2:
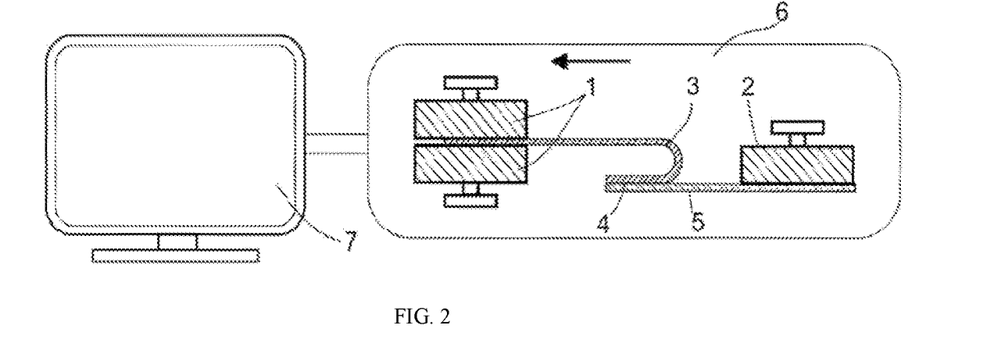

Step (1): ten pieces of different cigarette paper from China Tobacco Yunnan Industrial Co., Ltd are prepared and accurately cut to 15 mm in width and 50 mm in length. Artificial saliva is made according to Table 1. Medical silicon soft skin is prepared as the artificial mouth skin with a thickness of 1 mm, and the artificial mouth skin is cut to 15 mm in width and 50 mm in length. 10 μL artificial saliva is accurately transferred with a micro-injection needle and evenly smeared on the artificial mouth skin. The smearing area is 10×15=150 mm$^2$. The printing surface of cigarette tipping paper and the artificial mouth skin are bonded together through the artificial saliva and stay aside for 2 min. The dynamic friction coefficient determinator is selected as test equipment. As shown in FIG. 2, the other end of the bonded tipping paper and the other end of the artificial mouth skin are respectively clamped between the two chucks of the jigs of the dynamic friction coefficient determinator. The chuck distance is set to 50 mm and the movement rate is set to 50 mm/min. The two jigs are installed on an intelligent board (existing equipment) containing a force value sensor and a displacement sensor, and a force value/displacement acquisition system (usually a computer) is connected with the intelligent board containing the force value sensor and the displacement sensor, which can collect the change data of the force value and displacement in real time. The artificial mouth skin is fixed to a determination platform by the jig, as shown in FIG. 2. The maximum force collected at the moment when the tipping paper and the artificial lips are pulled apart is the sticking force. The lip sticking force is calculated according to an equation: F=sticking force (N)/sticking area (mm$^2$).

Step (2), the dynamic friction coefficients of the twenty-five samples are determined in accordance with GB10006-88 Plastics-Film and sheeting-Determination of the coefficients of friction.

Step (3), the thicknesses of the twenty-five samples are determined in accordance with GB/T 451.3-2002 Paper and board-Determination of thickness.

Step (4), the grammages of the twenty-five samples are determined in accordance with GB/T 451.2-2002 Paper and board-Determination of grammage.

Step (5), test results are shown in Table 5.

TABLE 5

Predicted value of the cigarette tipping paper lip sticking force

| Sample | Dynamic friction coefficient | Grammage (g/m$^2$) | Predicted sticking force (N/mm$^2$) |
|---|---|---|---|
| 1 | 0.273 | 42.3 | 1.99 × 10$^{-1}$ |
| 2 | 0.393 | 39.5 | 3.27 × 10$^{-3}$ |
| 3 | 0.353 | 37.3 | 2.68 × 10$^{-1}$ |
| 4 | 0.373 | 38.7 | 2.99 × 10$^{-1}$ |
| 5 | 0.442 | 39.3 | 3.83 × 10$^{-1}$ |
| 6 | 0.294 | 38.3 | 2.03 × 10$^{-1}$ |
| 7 | 0.542 | 36.6 | 4.88 × 10$^{-1}$ |
| 8 | 0.615 | 38.3 | 5.83 × 10$^{-1}$ |
| 9 | 0.311 | 42.1 | 2.43 × 10$^{-1}$ |
| 10 | 0.577 | 37.1 | 5.32 × 10$^{-1}$ |

It can be seen that the present invention provides a method capable of quickly and simply quantifying a sticking force of the cigarette tipper paper to lips, which can well avoid subjective factor influence and difference characterization brought by the traditional personal sensory smoking evaluation method, and greatly saves the detection cost and improves the efficiency.

The basic principles, main features and advantages of the present invention are shown and described above. It will be understood by those skilled in the art that the present invention is not limited to the foregoing embodiments, the foregoing embodiments and description are merely illustrative of the principles of the present invention. Various changes and modifications may be made without departing from the spirit and scope of the present invention, all of which fall within the scope of the present invention as claimed. The scope claimed by the present invention is defined by the appended claims and their equivalents.

What is claimed is:

1. A construction method of a prediction model for a lip sticking force of a cigarette tipping paper, wherein
the prediction model is $Y_{lip\ sticking\ force}=0.205+1.038\times M_{friction\ coefficient}$ when a thickness of the cigarette tipping paper belongs to a range of 0.069 mm-0.112 mm;
the prediction model is $Y_{lip\ sticking\ force}=-0.335+1.181\times M_{friction\ coefficient}\times D_{grammage}$ when the thickness of the cigarette tipping paper does not belong to the range of 0.069 mm-0.112 mm;
wherein $Y_{lip\ sticking\ force}$ is a predicted lip sticking force of the cigarette tipping paper; $M_{friction\ coefficient}$ is a dynamic friction coefficient of the cigarette tipping paper; and $D_{grammage}$ is a grammage of the cigarette tipping paper, and indicates gram weight per unit area;
the construction method comprises:
step (1), using a tester to measure a sticking force, wherein the sticking force is between printing surfaces of different tipping paper and an artificial mouth skin that are bonded together through artificial saliva, and calculating the sticking force per unit area as a measured lip sticking force of the cigarette tipping paper; wherein the tester is a debonding strength tester, a tensile tester or a dynamic friction coefficient determinator;
step (2), determining the dynamic friction coefficient of the cigarette tipping paper;

step (3), determining the thickness of the cigarette tipping paper;

step (4), determining the grammage of the cigarette tipping paper; and step (5), performing regression analysis by using the dynamic friction coefficient (M), the grammage (D) and the thickness (H) of the cigarette tipping paper as variables, and using the lip sticking force of the cigarette tipping paper as a reaction variable (Y) to obtain the prediction model for the lip sticking force of the cigarette tipping paper;

wherein in step (1), the cigarette tipping paper has a width range of 1 mm to 1000 mm and a length range of 1 mm to 1000 mm; and the artificial mouth skin is cut into a rectangle with a same size as the cigarette tipping paper, a first side of the cut artificial mouth skin oppositely sticks to a first side of the cigarette tipping paper through the artificial saliva, a sticking area is determined, and after staying aside until a constant weight, the tester is configured to measure a maximum debonding force of the cigarette tipping paper and artificial lips at a moment of separating, and the maximum debonding force is used as the lip sticking force of the cigarette tipping paper.

2. A determination method of the prediction model for the lip sticking force of the cigarette tipping paper according to claim 1, wherein a time of staying aside is 1 s to 1800 s.

3. A determination method of the prediction model for the lip sticking force of the cigarette tipping paper according to claim 1, wherein after staying aside until the constant weight, a second side of the cigarette tipping paper and a second side of the artificial mouth skin are not bonded together and are respectively clamped on two jigs of the tester, a distance and a relative movement rate between the two jigs are set to collect the maximum debonding force at the moment of separating the cigarette tipping paper from the artificial lip; the two jigs of the tester completely clamp the cigarette tipping paper and the artificial mouth skin; the tester has a load range of 0 N to 200 N and a resolution of greater than or equal to 0.01 N; and the distance between the two jigs of the tester is 5 mm to 500 mm, and the relative movement rate is 1 mm/min to 500 mm/min.

4. The construction method of the prediction model for the lip sticking force of the cigarette tipping paper according to claim 1, wherein in step (1), the artificial saliva includes sodium chloride, potassium chloride, calcium chloride, sodium dihydrogen phosphate, magnesium chloride, urea, glucose, mucin, amylase, acid phosphatase and lysozyme; wherein a pH value of the artificial saliva is 5.5 to 7.5; and a volume range of the artificial saliva is 1 μL to 1000 μL.

5. The construction method of the prediction model for the lip sticking force of the cigarette tipping paper according to claim 4, wherein in step (1), the artificial saliva contains 1.40 mmol/L sodium chloride, 0.5 mmol/L potassium chloride, 0.1 mmol/L calcium chloride, 0.15 mmol/L sodium dihydrogen phosphate, 0.025 mmol/L magnesium chloride, 0.09 mmol/L urea, 0.2 mmol/L glucose, 2.7 mmol/L bovine submandibular gland salivary mucin, 2.5 units/mL amylase, 0.004 units/mL acid phosphatase, and 0.7 units/mL lysozyme.

6. The construction method of the prediction model for the lip sticking force of the cigarette tipping paper according to claim 1, wherein a material of the artificial mouth skin is medical silicone rubber soft skin, active composite skin with an epidermal cell layer, polyvinyl chloride artificial leather, polyurethane dry artificial leather or polyolefin artificial leather.

7. A prediction method for a lip sticking force of a cigarette tipping paper, wherein a prediction model for the lip sticking force of the cigarette tipping paper is constructed by the construction method of the prediction model for the lip sticking force of the cigarette tipping paper of claim 1, the prediction method comprises:

collecting the thickness, the dynamic friction coefficient and the gram weight per unit area of the cigarette tipping paper, and then bringing the thickness, the dynamic friction coefficient and the gram weight per unit area into the prediction model for the lip sticking force of the cigarette tipping paper for calculation, to obtain the lip sticking force of the cigarette tipping paper.

8. The prediction method for the lip sticking force of the cigarette tipping paper according to claim 7, wherein a time of staying aside 1 s is to 1800 s.

9. The prediction method for the lip sticking force of the cigarette tipping paper according to claim 7, wherein after staying aside until the constant weight, a second side of the cigarette tipping paper and a second side of the artificial mouth skin are not bonded together and are respectively clamped on two jigs of the tester, a distance and a relative movement rate between the two jigs are set to collect the maximum debonding force at the moment of separating the cigarette tipping paper from the artificial lip; the two jigs of the tester completely clamp the cigarette tipping paper and the artificial mouth skin; the tester has a load range of 0 N to 200 N and a resolution of greater than or equal to 0.01 N; and the distance between the two jigs of the tester is 5 mm to 500 mm, and the relative movement rate is 1 mm/min to 500 mm/min.

10. The prediction method for the lip sticking force of the cigarette tipping paper according to claim 7, wherein in step (1), the artificial saliva includes sodium chloride, potassium chloride, calcium chloride, sodium dihydrogen phosphate, magnesium chloride, urea, glucose, mucin, amylase, acid phosphatase and lysozyme; wherein a pH value of the artificial saliva is 5.5 to 7.5; and a volume range of the artificial saliva is 1 μL to 1000 μL.

11. The prediction method for the lip sticking force of the cigarette tipping paper according to claim 10, wherein in step (1), the artificial saliva contains 1.40 mmol/L sodium chloride, 0.5 mmol/L potassium chloride, 0.1 mmol/L calcium chloride, 0.15 mmol/L sodium dihydrogen phosphate, 0.025 mmol/L magnesium chloride, 0.09 mmol/L urea, 0.2 mmol/L glucose, 2.7 mmol/L bovine submandibular gland salivary mucin, 2.5 units/mL amylase, 0.004 units/mL acid phosphatase, and 0.7 units/mL lysozyme.

12. The prediction method for the lip sticking force of the cigarette tipping paper according to claim 7, wherein a material of the artificial mouth skin is medical silicone rubber soft skin, active composite skin with an epidermal cell layer, polyvinyl chloride artificial leather, polyurethane dry artificial leather or polyolefin artificial leather.

* * * * *